(12) United States Patent
Weimerskirch

(10) Patent No.: US 10,318,760 B2
(45) Date of Patent: Jun. 11, 2019

(54) SYSTEM AND METHOD FOR PRIVACY PROTECTION OF SEATING BIOMETRICS

(71) Applicant: Lear Corporation, Southfield, MI (US)

(72) Inventor: Andre Weimerskirch, Southfield, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 15/483,537

(22) Filed: Apr. 10, 2017

(65) Prior Publication Data
US 2018/0293401 A1 Oct. 11, 2018

(51) Int. Cl.
| G06F 21/62 | (2013.01) |
| G06K 9/00 | (2006.01) |
| B60W 40/08 | (2012.01) |
| B60W 50/14 | (2012.01) |

(52) U.S. Cl.
CPC ..... G06F 21/6245 (2013.01); G06K 9/00892 (2013.01); *B60W 2040/0872* (2013.01); *B60W 2050/146* (2013.01); *B60W 2420/00* (2013.01); *B60W 2420/42* (2013.01); *B60W 2750/40* (2013.01); *G06K 2009/00939* (2013.01)

(58) Field of Classification Search
CPC ............ G06F 21/6245; G06K 9/00892; G06K 2009/00939; B60W 2750/40; B60W 2420/00; B60W 2050/146; B60W 2040/0872; B60W 2420/42
See application file for complete search history.

(56) References Cited

U.S. PATENT DOCUMENTS

| 9,489,966 | B1 * | 11/2016 | Hassani | G10L 15/22 |
| 9,921,726 | B1 * | 3/2018 | Sculley | G06F 3/0484 |
| 2002/0103622 | A1 * | 8/2002 | Burge | G07C 5/008 |
| | | | | 702/183 |
| 2006/0251293 | A1 * | 11/2006 | Piirainen | B60N 2/002 |
| | | | | 382/104 |
| 2011/0155803 | A1 * | 6/2011 | Nieuwland | B60R 16/037 |
| | | | | 235/380 |

(Continued)

OTHER PUBLICATIONS

Walter et al., "The smart car seat: personalized monitoring of vital signs in automotive applications", 2011, Springer-Verlag, pp. 707-715. (Year: 2011).*

(Continued)

*Primary Examiner* — Matthew Smithers
(74) *Attorney, Agent, or Firm* — Brooks Kushman P.C.

(57) ABSTRACT

In one embodiment, a system for providing privacy protection of biometric related information for an occupant in a vehicle is provided. The system includes a memory device and at least one controller. The at least one controller including the memory device and is configured to receive first biometric information for a vehicle occupant from a plurality of biometric sensors positioned within a seat of the vehicle and to receive a first signal indicative of a first privacy setting from a plurality of privacy settings to share the first biometric information. The at least one controller is further configured to transmit the first biometric information internally within the vehicle in response to the first signal and to prevent the first biometric information from being transmitted externally from the vehicle in response to the first signal.

20 Claims, 2 Drawing Sheets

(56) References Cited

U.S. PATENT DOCUMENTS

| | | | |
|---|---|---|---|
| 2013/0030645 A1* | 1/2013 | Divine | B60K 35/00 701/36 |
| 2013/0135118 A1 | 5/2013 | Ricci | |
| 2014/0025540 A1* | 1/2014 | Hendrickson | G06Q 30/02 705/26.81 |
| 2014/0135598 A1* | 5/2014 | Weidl | A61B 5/0205 600/301 |
| 2014/0276090 A1* | 9/2014 | Breed | A61B 5/18 600/473 |
| 2014/0285216 A1* | 9/2014 | Cuddihy | G01R 27/2605 324/658 |
| 2014/0316607 A1 | 10/2014 | Le et al. | |
| 2014/0316660 A1 | 10/2014 | Le et al. | |
| 2015/0210287 A1 | 7/2015 | Penilla et al. | |
| 2016/0041820 A1 | 2/2016 | Ricci et al. | |
| 2016/0086391 A1 | 3/2016 | Ricci | |
| 2016/0086393 A1 | 3/2016 | Collins et al. | |
| 2016/0354027 A1* | 12/2016 | Benson | A61M 21/02 |
| 2017/0086045 A1* | 3/2017 | Lucero | H04W 4/22 |
| 2017/0126680 A1* | 5/2017 | Yusuf | H04W 12/02 |
| 2017/0143270 A1* | 5/2017 | Song | A61B 5/6893 |
| 2017/0316533 A1* | 11/2017 | Goldman-Shenhar | G06Q 50/30 |
| 2018/0025553 A1* | 1/2018 | Bajwa | G06F 21/604 |

OTHER PUBLICATIONS

Yang et al., "Vehicle Driver's ECG and sitting posture monitoring system", Nov. 2009, IEEE, pp. 1-4. (Year: 2009).*

* cited by examiner

SYSTEM AND METHOD FOR PRIVACY PROTECTION OF SEATING BIOMETRICS

TECHNICAL FIELD

Aspects disclosed herein generally relate to a system and method for privacy protection of seating biometrics in a vehicle. These aspects and others will be discussed in more detail herein.

BACKGROUND

U.S. Publication No. 2015/0210287 to Penilla discloses a vehicle including one or more computers to interface with electronics of the vehicle to access status data for systems of the vehicle and to make input settings to one or more of the systems. The vehicle includes wireless communication circuitry for providing connection to the Internet and to one or more wireless devices when paired with the vehicle. An occupancy sensor of the vehicle is configured to interface with the one or more computers of the vehicle to identify occupancy of seats of the vehicle. A processor of the one or more computers of the vehicle is configured to execute instructions to receive data from a wireless device that is paired with the vehicle. The data is used to identify a seat in the vehicle that is associated with a passenger. The processor executes instructions to provide data to a user interface accessed by the wireless device to expose a plurality of systems of the vehicle. The plurality of systems relates to an environment zone in which the seat is located in the vehicle. The user interface further includes controls to enable input of settings to one or more of the plurality of vehicle systems to make changes to the one or more of the plurality of vehicle systems. The changes made relate to one or more of the plurality of systems that relate to the environment zone of the seat.

SUMMARY

In one embodiment, a system for providing privacy protection of biometric related information for an occupant in a vehicle is provided. The system includes a memory device and at least one controller. The at least one controller including the memory device and is configured to receive first biometric information for a vehicle occupant from a plurality of biometric sensors positioned within a seat of the vehicle and to receive a first signal indicative of a first privacy setting from a plurality of privacy settings to share the first biometric information. The at least one controller is further configured to transmit the first biometric information internally within the vehicle in response to the first signal and to prevent the first biometric information from being transmitted externally from the vehicle in response to the first signal.

In another embodiment, a system for providing privacy protection of biometric related information for an occupant in a vehicle is provided. The system includes a vehicle seat and a controller positioned within the vehicle seat. The controller is configured to receive first biometric information for a vehicle occupant from a plurality of biometric sensors and to receive a first signal indicative of a first privacy setting from a plurality of privacy settings to share the first biometric information. The controller is further configured to transmit the first biometric information internally within the vehicle in response to the first signal and to prevent the first biometric information from being transmitted externally from the vehicle in response to the first signal.

In another embodiment, a system for providing privacy protection of biometric related information for an occupant in a vehicle is provided. The system includes a memory device and a controller. The controller includes the memory device and is configured to receive biometric information for a vehicle occupant from a first mobile device. The controller is further configured to receive a signal indicative of a privacy setting from a plurality of privacy settings to share the biometric information from one of a user interface mounted in the vehicle and the first mobile device. The controller is further configured to transmit the biometric information externally from the vehicle to one of an emergency call center and a second mobile device based on the signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
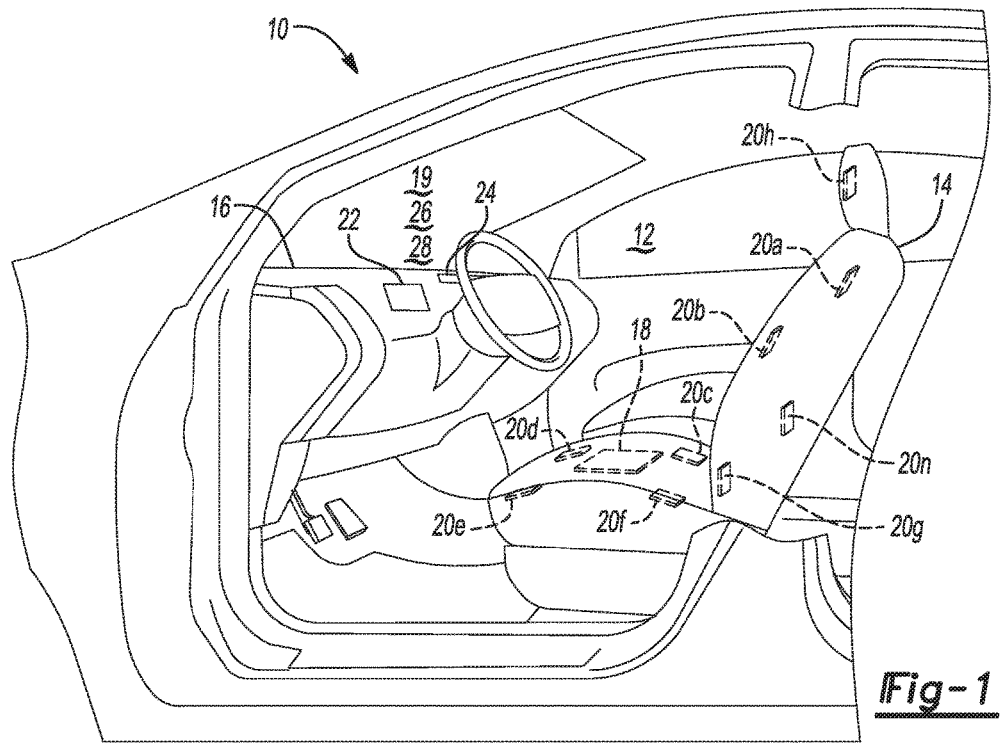
FIG. 1 generally illustrates a system that provides privacy protection of biometrics in a vehicle in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilize one or more microprocessors to execute a computer-program that is embodied in a non-transitory computer readable medium that is programmed to perform the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for transmitting and receiving data, respectively, to and from other hardware based devices as discussed herein.

Vehicle seats may be equipped with biometrics sensors to determine weight, body shape, height, heart rate, etc., of the driver and/or vehicle passenger(s). Such biometric information may be useful to provide to various controllers in the vehicle that may mitigate injury for the driver and/or vehicle passenger(s). In addition, the biometric information, if readily available, may be useful to emergency first responders while approaching the scene of a vehicle accident. While the biometric data may be useful, concerns regarding privacy over the biometric data may exist with the driver and/or vehicle passengers.

Aspects disclosed herein provide for various implementations that will enable the driver and/or vehicle passengers to control the manner in which the biometric information as obtained by the vehicle may be disclosed. For example, the driver and/or vehicle passenger(s) may simply elect to provide the biometric information internally to vehicle controllers in the vehicle to mitigate injury when an accident is detected. Alternatively, the driver and/or vehicle passengers(s) may elect to transmit some biometric information externally from the vehicle to aid in providing information to an emergency responder or emergency contact when an accident is detected. The emergency provider may be able to better assist the driver and/or vehicle passenger by having the biometric information prior to arriving at the scene of the accident. For example, the emergency provider may be able to treat the driver and/or vehicle passenger more rapidly since the emergency provider may not have to waste an additional time in gathering the biometric information. In addition, the driver and/or vehicle passenger(s) may elect to provide any and all biometric information that is available to the vehicle to the emergency responder. These aspects and others will be discussed in more detail below. It is recognized that driver and/or vehicle passenger may also elect to protect the privacy of other personal information that may not be necessarily related to personal health/safety issues.

FIG. 1 generally illustrates a system 10 that provides privacy protection of biometric related information for a driver and/or vehicle passenger (i.e., vehicle occupant) in a vehicle 12 in accordance to one embodiment. The vehicle 12 includes at one seat 14 (hereafter "seat 14") and an instrument panel 16. It is recognized that the seat 14 may be a driver seat or any vehicle passenger seat. The seat 14 generally includes a seat controller 18 and various biometric sensors 20a-20h ("20"). The seat controller 18 generally includes at least one processor (not shown) and at least one memory device 23. The biometric sensors 20 are generally configured to collect biometric information for the driver and/or vehicle passenger(s) in the vehicle 12. The biometric information may correspond to, for example, weight, height, body shape, and heart rate of the driver and/or the vehicle passengers. The biometric sensors 20 generally transmit signals indicative of the biometric information to the seat controller 18 for processing and/or transmission to other controllers in vehicle 12. An in-vehicle camera 19 may be positioned on a rear view mirror (not shown) that is positioned above the instrument panel 16. The in-vehicle camera 19 may be arranged to capture images of the driver or vehicle passengers. The captured images may provide information indicative of the height of the driver or the passenger. In this regard, the in-vehicle camera 19 may be defined as a biometric sensor 20 and provide biometric information.

The instrument panel 16 generally includes a human machine interface ("HMI") display 22 (hereafter "display") (or user interface) that electronically communicates with the seat controller 18. While not shown, the seat controller 18 and the display 22 may transmit/receive data to and from one another via a data communication bus (not shown). The bus may be implemented as a High/Medium Speed Controller Area Network (CAN) bus, a Local Interconnect Network (LIN) bus, or other suitable bus generally situated to facilitate data transfer in the vehicle 12. The particular type of bus used may be varied to meet the desired criteria of a particular implementation. It is recognized that the seat controller 18 may transmit/data to and from any electrical devices as disclosed herein via the data communication bus. The display 22 may be arranged to include various switches (or selectable switches) via a touch screen implementation to enable the driver or vehicle passenger to select the manner in which the biometric information is disseminated within the vehicle 12 and externally from the vehicle 12.

In one example, the system 10 includes an airbag controller 24 (e.g., safety controller) that is configured to employ a vehicle safety measure, such as but not limited to, deploy one or more airbags positioned proximate to the driver and/or vehicle passengers in the vehicle 12. The driver may select via the display 22, a vehicle only option which provides the biometric information such as the height, weight, and/or body shape to the airbag controller 24 for purposes of deploying the airbag(s) (not shown) in response to the vehicle 12 experiencing a collision with another object. The airbag controller 24 may adjust the inflation rate of the airbag based on the height, weight, and/or body shape of the driver or the passenger. For example, the airbag controller 24 may not fill the airbag with as much air if the driver or the passenger is light. Alternatively, the airbag controller 24 may fill the airbag with more air if the driver or the passenger is heavier to properly restrain the heavier person. With the vehicle only option, the driver may elect to share the biometric information only internally within the vehicle. In this case, the seat controller 18 prevents the transmission of the biometric information from being transmitted to any device that is located external to the vehicle 12.

The system 10 may also include an in-vehicle communication controller 26 positioned within the vehicle 12. The in-vehicle communication controller 26 is configured to electrically communicate with emergency personnel (or E-CALL center) in moments in which the vehicle 12 undergoes a state of duress such as a collision or accident. For example, the in-vehicle communication controller 26 may be electrically coupled to the airbag controller 24. The in-vehicle communication controller 26 may contact, via cellular communication, emergency personnel in response to the air-bag controller 24 (or any other controller in the vehicle) providing an indication of the vehicle 12 experiencing an accident (e.g., vehicle rollover, etc.) or collision. In addition, the in-vehicle communication controller 26 may also enable a mobile device 28 that is positioned within the vehicle 12 and that belongs to the driver and/or the vehicle passenger to communicate with another mobile device (not shown) that is external to the vehicle 12 to automatically provide an indication that the vehicle 12 is in a state of duress (e.g., collision, vehicle rollover, etc.) Any one of the seat controller 18, the display 22, and the in-vehicle communication controller 26 may receive the images from the in-vehicle camera 19 and process the captured images therefrom to determine the height and the weight of the driver or the vehicle passenger. If the seat controller 18 does not perform the actual processing of the captured images, then the height and weight information for the driver and passenger will be transmitted to the seat controller 18 from the device in the vehicle 12 that processes the captured image to store the information. This operation may be performed at vehicle start up.

The display 22 enables the driver and/or vehicle passenger to select a limited external option with respect to the dissemination of the biometric information. The limited external option includes transmitting a portion of the biometric information via the seat controller 18 to the in-vehicle communication controller 26 for transmitting such information to emergency personnel or to a mobile device 28 positioned external to the vehicle 12. With the limited external option, the in-vehicle communication controller 26 may transmit the height and the weight of the driver and/or vehicle passengers to the emergency personnel or to the mobile device 28.

The mobile device 28 may also be defined as a biometric sensor. For example, the mobile device 28 may store biometric information for the driver and/or vehicle passenger. In one example, the mobile device 28 may store the medical history for the driver or passenger and transmit such data to the in-vehicle communication controller 26 when the vehicle 12 detects the presence of the mobile device 28, assuming the driver or passenger enables the mobile device 28 to do so. The medical history may include, but not limited to, prescription history (including current medical prescriptions), medical tests performed, blood test history, blood status (e.g., blood pressure, fat content in blood, glucose levels, etc.), recent medical status on any ailments, etc. For example, the mobile device 28 (or seat 14) may include technology as provided by H2 care™, 714, 2, Gasan digital 1-ro, Geumcheon-gu, Seoul, Korea 08591 which provides wearable blood pressure monitors. Alternatively or additionally, the mobile device 28 (or seat 14 for that matter) may include technology such as InBody™ (or InBody™ Band) based out of South Korea that may measure heart rate, body fat percentage, muscle mass, and body mass index (BMI). Alternatively or additionally, the mobile device 28 (or seat 14) may include technology such as PKVitality™ based out of Paris, France that may function as a glucometer to measure glucose levels of the driver and the vehicle passenger(s).

The in-vehicle communication controller 26 may store this information or transmit the medical history information for the driver and the passenger to the seat controller 18 for storage thereon. It is recognized that the mobile device 28 may also be Fitbit™, Apple Watch™, or other device that is coupled to the body and that may obtain current medical status of the driver or the passenger when in the vehicle 12. For example, the mobile device 28 may execute an application and ascertain heart rate, blood pressure, fat content in blood, glucose levels, body fat percentage, muscle mass, BMI, etc. from the driver or passenger and provide current readings of the same to the vehicle 12 if the driver and/or passenger enables the mobile device 28 to do so.

The display 22 may also enable the driver and/or vehicle passenger to select a full external option with respect to the dissemination of the biometric information. The full external option includes a full listing of the biometric information that is available to the in-vehicle communication controller 26 for transmitting such information via the seat controller 18 (or other suitable controller) to emergency personnel or to the mobile device 28 positioned external to the vehicle 12. For example, the seat controller 18 (or other suitable controller in the vehicle 12) may store the medical history as received from the mobile device 28 including the medical history and/or recent readings or measurements as performed by the mobile device 28 such as blood pressure, fat content in blood, glucose levels, etc., and enable such data to be transmitted same externally from the vehicle 12 to another mobile device 28 or to emergency personnel. In this case, the in-vehicle communication controller 26 may transmit the height, weight, body shape, heart rate, images of the driver and/or vehicle occupants, blood pressure, fat content in blood, glucose levels, etc. to the emergency personnel or another mobile device 28.

Figure 2:
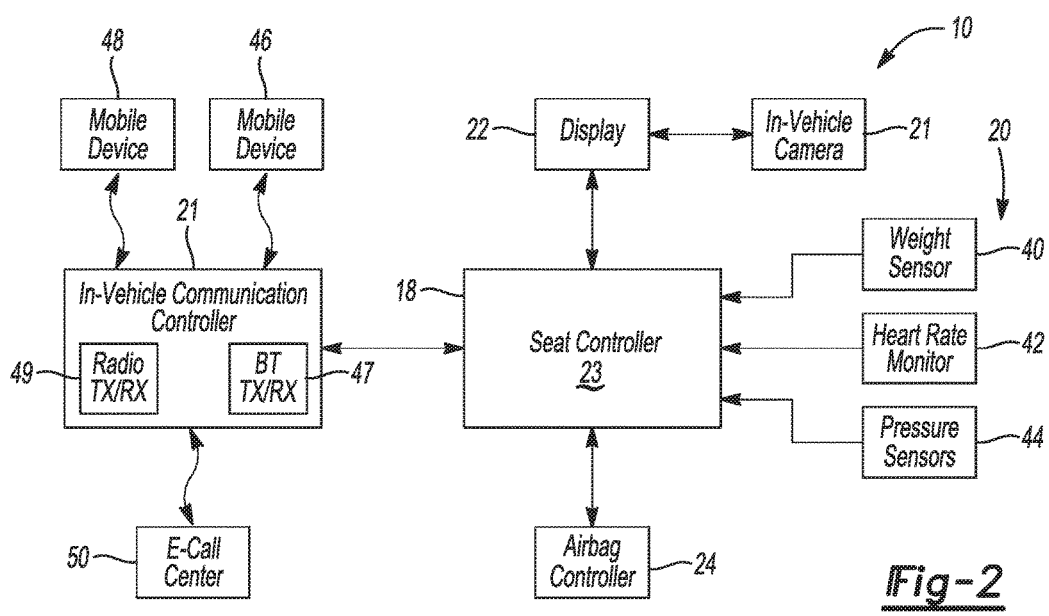
FIG. 2 generally illustrates a block diagram of the system for providing privacy protection of biometrics in accordance to one embodiment.

FIG. 2 generally illustrates a block diagram of the system 10 for providing privacy protection of biometrics in accordance to one embodiment. The biometric sensors 20 generally include the in-vehicle camera 19, at least one weight sensor 40 (hereafter "weight sensor"), at least one heart monitor (hereafter "heart monitor sensor" or "heart-rate sensor") 42, a plurality of pressure sensors 44, and a first mobile device 46 that belongs to the driver or a vehicle passenger. The weight sensor 40 is generally positioned within the seat 14 and is configured to provide weight information for the driver or vehicle passenger to the seat controller 18. The heart rate sensor 42 is also generally positioned in the seat 14 and is configured to provide heart rate information for the driver and or vehicle passenger to the seat controller 18. The pressure sensors 44 may be distributed sensors positioned above an outer contour of the seat 14 to provide the body shape for the driver or the vehicle passenger to the seat controller 18. For example, each pressure sensor 44 may sense the amount of pressure applied to a corresponding portion of the seat and provide information corresponding to the body shape based on the sensed pressure across the seat 14. The body shape may correspond to the gender of the driver or the vehicle passenger. As noted above, the in-vehicle camera 19 may capture images of the driver and/or vehicle passenger and transmit information corresponding to the same to the display 22 (or other suitable electronic device in the vehicle 12) for processing. The display 22 may then transmit the captured images of the driver and/or vehicle passenger to the in-vehicle communication controller 21 for transmission external to the vehicle 12. The first mobile device 46 may provide the medical history for the driver or the vehicle occupant in addition to providing recent current medical status such as current readings of blood pressure, fat content in blood, glucose levels, etc.

The display 22 (or user interface) enables the driver to select various options (e.g., vehicle only option, limited external option, and full external option, etc.) with respect to the amount of biometric data that is shared to electrical devices positioned external to the vehicle 12. The display 22 transmits information corresponding to the selected option to the seat controller 18 which then controls the level of biometric information that is disseminated based on the selected option. A first mobile device 46 may be electrically coupled to the in-vehicle communication controller 21 and engage in bi-directional communication with the in-vehicle communication controller 21. The first mobile device 46 may belong to the driver or to the vehicle passenger. The in-vehicle communication controller 21 includes a BLUETOOTH transceiver 47 to electrically communicate with the first mobile device 46. The driver and/or vehicle passenger may select one of the options (e.g., vehicle only option, limited external option, and full external option, etc.) with respect to the amount or level of biometric information that is shared internally within the vehicle 12 and externally from the vehicle 12. In short, the first mobile device 46 may be used instead of the display 22 for selecting the corresponding option. In this case, the first mobile device 46 may transmit a control signal which corresponds to the selected option to the in-vehicle communication controller 21. The in-vehicle communication controller 21 may then provide the selected option to the seat controller 18.

The in-vehicle communication controller 21 may also include a radio wave transceiver 49 for electrically communicating with a second mobile device 48 and/or an emergency call (E-CALL) center 50. It is recognized that the second mobile device 48 may be external to the vehicle 12 and may belong to a family member or other close associate to the driver and/or vehicle passenger (e.g., emergency contact). The driver and/or vehicle passenger may control whether the in-vehicle communication controller 21 provides the biometric information to the E-CALL center 50 and/or the second mobile device 48 based on a selection performed either through the display 22 or through the first mobile device 46. The first mobile device 46 may also provide biometric information as noted above to the seat controller 18.

Figure 3:
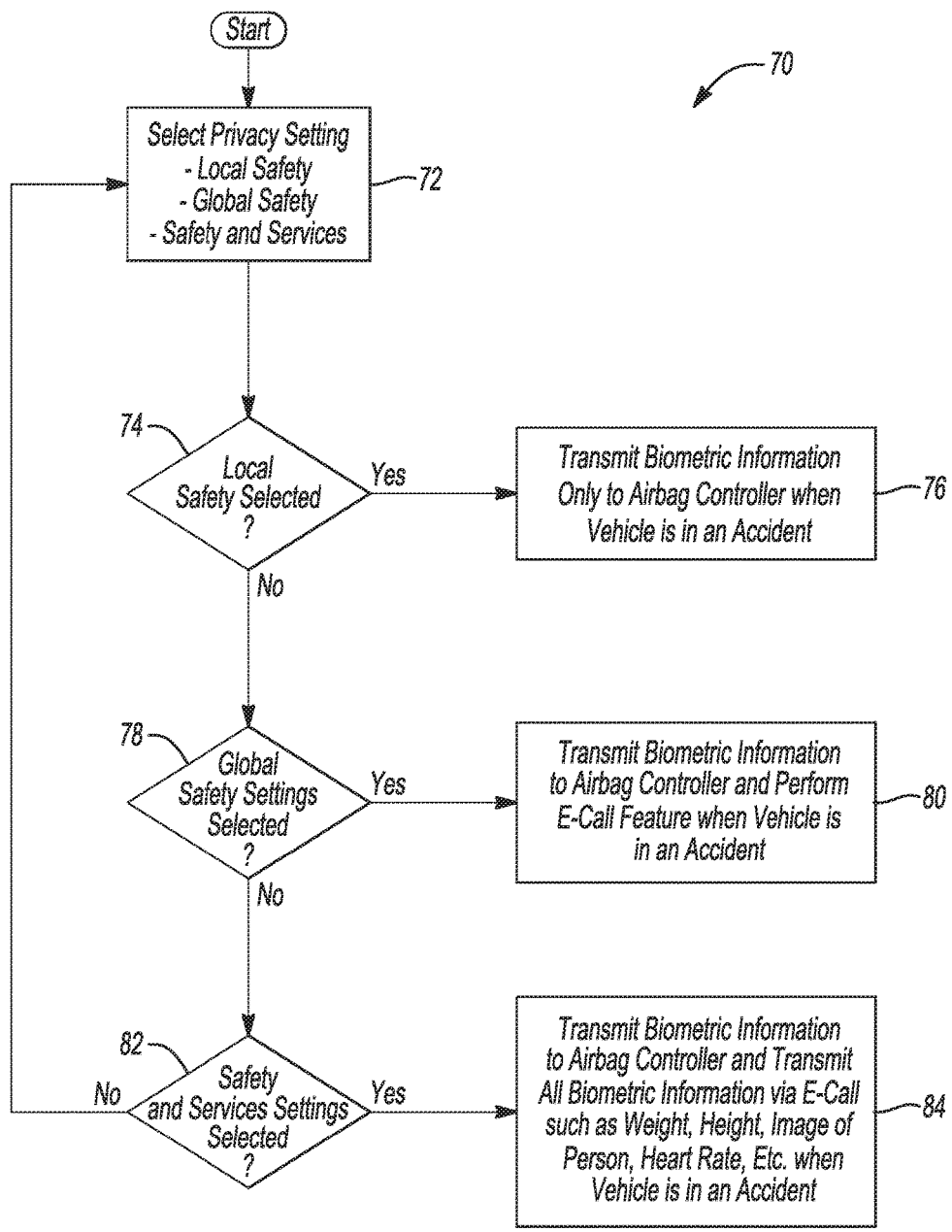
FIG. 3 generally illustrates a method for providing privacy protection of biometrics in accordance to one embodiment.

FIG. 3 generally illustrates a method 70 for providing privacy protection of biometrics in accordance to one embodiment.

In operation 72, the display 22 or the first mobile device 46 receives an input from the driver and/or vehicle passenger indicating the corresponding privacy setting with respect to the dissemination of the biometric information collected by the seat controller 18. The seat controller 18 receives information corresponding to the selected privacy setting from the display 22 (i.e., if entered via the display 22) or the in-vehicle communication controller 21 (i.e., if entered via the first mobile device 46).

In operation 74, the seat controller 18 determines whether the privacy setting corresponds to a vehicle only option in response to the selection provided by the display 22 or the in-vehicle communication controller 21. If the seat controller 18 determines that the selection corresponds to the vehicle-only option, then the method 70 proceeds to operation 76. If not, then the method 70 proceeds to operation 78.

In operation 76, the seat controller 18 may transmit biometric information corresponding to the height, weight, and/or body shape for the driver and/or vehicle passenger(s) to the airbag controller 24 for purposes of deploying the airbag(s) (not shown) in response to the vehicle 12 experiencing a collision with another object.

In operation 78, the seat controller 18 determines whether the privacy setting corresponds to a limited external option in response to the selection provided by the display 22 or the in-vehicle communication controller 21. If the seat controller 18 determines that the selection corresponds to the limited external option, then the method 70 proceeds to operation 80. If not, then the method 70 proceeds to operation 82.

In operation 80, the seat controller 18 may transmit biometric information corresponding to the height and weight of the driver and/or vehicle passengers to emergency personnel (i.e., E-CALL center 50) or the second mobile device 48, via the in-vehicle communication controller 21, for notifying the same that the vehicle is in a state of distress (i.e., accident or collision) and to provide emergency personnel or the emergency contact information that may be useful for purposes of treating the driver and/or vehicle passenger(s). It is recognized in operation 80 that the seat controller 18 continues to transmit the biometric information corresponding to the height, weight, and/or body shape to the airbag controller 24 for deploying airbags in the vehicle 12 as well.

In operation 82, the seat controller 18 determines whether the privacy setting corresponds to a full external option in response to the selection provided by the display 22 or the in-vehicle communication controller 21. If the seat controller 18 determines that the selection corresponds to the full external option, then the method 70 proceeds to operation 84. If not, then the method 70 returns back to operation 72.

In operation 84, the seat controller 18 may transmit a full listing of any and all biometric information that is available such as the height, weight, body shape, heart rate, and images of the driver and/or vehicle occupants, medical history, prescription history, blood pressure, fat content in blood, glucose levels, muscle mass, BMI, etc., to emergency personnel (i.e., E-CALL center 50) or the second mobile device 48, via the in-vehicle communication controller 21, for notifying the same that the vehicle is in a state of distress (i.e., accident or collision) and to provide emergency personnel or the emergency contact information with the full listing of biometric information that may be useful for purposes of treating the driver and/or vehicle passenger(s) in advance of arriving at the vehicle 12. It is recognized in operation 84 that the seat controller 18 continues to transmit the biometric information corresponding to the height, weight, and/or body shape to the airbag controller for deploying airbags in the vehicle 12 as well.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for providing privacy protection of biometric related information for an occupant in a vehicle, the system comprising:
    a memory device; and
    at least one controller including the memory device and being configured to:
        receive first biometric information for a vehicle occupant from a plurality of biometric sensors positioned within a seat of the vehicle;
        receive a first signal indicative of a first privacy setting from a plurality of privacy settings to share the first biometric information; and
        transmit the first biometric information internally within the vehicle in response to the first signal,
        wherein the first privacy setting enables the vehicle to deploy an airbag in the vehicle in response to a vehicle collision and the first privacy setting corresponds to preventing the first biometric information from being transmitted externally from the vehicle in response to the first signal.

2. The system of claim 1, wherein the at least one controller is further configured to receive a second signal indicative of a second privacy setting from the plurality of privacy settings.

3. The system of claim 2, wherein the at least one controller is further configured to transmit the first biometric information internally within the vehicle and externally from the vehicle to one of an emergency call center and a mobile device that is positioned external to the vehicle based on the second signal.

4. The system of claim 3, wherein the at least one controller is further configured to receive the first signal and the second signal from a user interface positioned in the vehicle.

5. The system of claim 3, wherein the at least one controller is further configured to receive the first signal and the second signal from a mobile device.

6. The system of claim 1, wherein the first biometric information corresponds to at least one of a weight of the vehicle occupant, a height of the vehicle occupant, and a body shape of the vehicle occupant.

7. The system of claim 1, wherein the at least one controller is further configured to receive second biometric information and to receive a second signal indicative of second privacy setting from the plurality of privacy settings.

8. The system of claim 7, wherein the at least one controller is further configured to transmit the second biometric information internally within the vehicle and externally from the vehicle to one of an emergency call center and a mobile device that is positioned external to the vehicle based on the second signal.

9. The system of claim 8, wherein the second biometric information corresponds to at least one of a weight of the vehicle occupant, a height of the vehicle occupant, a body shape of the vehicle occupant, a heart rate of the vehicle occupant, a medical history of the vehicle occupant, an image of the vehicle occupant, information corresponding to current medical prescriptions of the vehicle occupant, and information corresponding to bloodwork for the vehicle occupant.

10. A system for providing privacy protection of biometric related information for an occupant in a vehicle, the system comprising:
    a vehicle seat; and
    a controller positioned within the vehicle seat and being configured to:
        receive first biometric information for a vehicle occupant from a plurality of biometric sensors;
        receive a first signal indicative of a first privacy setting from a plurality of privacy settings to share the first biometric information; and
        transmit the first biometric information internally within the vehicle in response to the first signal,
        wherein the first privacy setting enables the vehicle to deploy an airbag in the vehicle in response to a vehicle collision and the first privacy setting corresponds to preventing the first biometric information from being transmitted externally from the vehicle in response to the first signal.

11. The system of claim 10, wherein the controller is further configured to receive a second signal indicative of a second privacy setting from the plurality of privacy settings.

12. The system of claim 11, wherein the controller is further configured to transmit the first biometric information internally within the vehicle and to enable the first biometric information to be transmitted externally from the vehicle to one of an emergency call center and a mobile device that is positioned external to the vehicle based on the second signal.

13. The system of claim 12, wherein the controller is further configured to receive the first signal and the second signal from a user interface positioned in the vehicle.

14. The system of claim 12, wherein the controller is further configured to receive the first signal and the second signal from a mobile device.

15. The system of claim 10, wherein the first biometric information corresponds to at least one of a weight of the vehicle occupant, a height of the vehicle occupant, and a body shape of the vehicle occupant.

16. The system of claim 10, wherein the controller is further configured to receive second biometric information and to receive a second signal indicative of a second privacy setting from the plurality of privacy settings.

17. The system of claim 16, wherein the controller is further configured to transmit the second biometric information internally within the vehicle and to enable the second biometric information to be transmitted externally from the vehicle based on the second signal.

18. The system of claim 17, wherein the second biometric information corresponds to at least one of a weight of the vehicle occupant, a height of the vehicle occupant, a body shape of the vehicle occupant, a heart rate of the vehicle occupant, a medical history of the vehicle occupant, an image of the vehicle occupant, information corresponding to current medical prescriptions of the vehicle occupant, and information corresponding to bloodwork for the vehicle occupant.

19. A system for providing privacy protection of biometric related information for an occupant in a vehicle, the system comprising:
    a memory device; and
    a controller including the memory device and being configured to:
        receive biometric information for a vehicle occupant from a first mobile device; and
        receive a signal indicative of a privacy setting from a plurality of privacy settings to share the biometric information from one of a user interface mounted in the vehicle and the first mobile device,
        wherein the privacy setting enables the vehicle to deploy an airbag in the vehicle in response to a vehicle collision and enables a transmission of the biometric information externally from the vehicle to one of an emergency call center and a second mobile device based on the signal.

20. The system of claim 19, wherein the biometric information corresponds to wherein the biometric information corresponds to at least one of a weight of the vehicle occupant, a height of the vehicle occupant, a body shape of the vehicle occupant, a heart rate of the vehicle occupant, a medical history of the vehicle occupant, an image of the vehicle occupant, information corresponding to current medical prescriptions of the vehicle occupant, and information corresponding to bloodwork for the vehicle occupant.

* * * * *

UNITED STATES PATENT AND TRADEMARK OFFICE
CERTIFICATE OF CORRECTION

PATENT NO. : 10,318,760 B2
APPLICATION NO. : 15/483537
DATED : June 11, 2019
INVENTOR(S) : Weimerskirch Page 1 of 1

It is certified that error appears in the above-identified patent and that said Letters Patent is hereby corrected as shown below:

In the Claims

Column 10, Lines 46-48, Claim 20:
After "wherein the biometric information corresponds to"
Delete "wherein the biometric information corresponds to" (second occurrence)

Signed and Sealed this
Seventeenth Day of March, 2020

Andrei Iancu
*Director of the United States Patent and Trademark Office*